(12) United States Patent
Ishibashi

(10) Patent No.: US 10,094,677 B2
(45) Date of Patent: Oct. 9, 2018

(54) ROUTE GUIDANCE APPARATUS, ROUTE GUIDANCE METHOD AND COMPUTER PROGRAM

(71) Applicant: Sony Corporation, Tokyo (JP)

(72) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/811,096

(22) Filed: Nov. 13, 2017

(65) Prior Publication Data

US 2018/0073883 A1 Mar. 15, 2018

Related U.S. Application Data

(63) Continuation of application No. 13/080,292, filed on Apr. 5, 2011, now Pat. No. 9,846,048.

(30) Foreign Application Priority Data

Apr. 14, 2010 (JP) ................................ 2010-093084

(51) Int. Cl.
*G01C 21/34* (2006.01)
*G01C 21/36* (2006.01)
*B60L 11/18* (2006.01)

(52) U.S. Cl.
CPC ...... *G01C 21/3469* (2013.01); *B60L 11/1862* (2013.01); *G01C 21/3676* (2013.01); *B60L 2240/642* (2013.01); *B60L 2260/54* (2013.01)

(58) Field of Classification Search
CPC ............ G01C 21/3469; G01C 21/3676; B60L 11/1862; B60L 2240/642; B60L 2260/54; Y02T 10/7291
See application file for complete search history.

(56) References Cited

U.S. PATENT DOCUMENTS

| 5,487,002 | A | * | 1/1996 | Diller | ..................... B60L 1/003 320/128 |
| 5,627,752 | A | * | 5/1997 | Buck | .................... B60K 26/021 180/65.8 |
| 5,790,976 | A | * | 8/1998 | Boll | ......................... B60L 3/12 180/65.8 |
| 5,815,824 | A | * | 9/1998 | Saga | ....................... B60K 6/46 180/65.245 |
| 5,892,346 | A | * | 4/1999 | Moroto | .................. B60K 6/485 318/139 |
| 5,913,917 | A | * | 6/1999 | Murphy | ............. B60R 16/0232 701/123 |

(Continued)

FOREIGN PATENT DOCUMENTS

JP 2008-281362 11/2008

*Primary Examiner* — Thomas Ingram
(74) *Attorney, Agent, or Firm* — K&L Gates LLP

(57) ABSTRACT

There is provided a route guidance apparatus including a route search unit which searches for at least one route, to a predetermined destination, which is to be traveled by an electric vehicle propelled by electric power stored in a secondary battery provided within the vehicle, and a power consumption calculation unit which calculates power consumption of the electric vehicle when a route to a destination, which was searched for by the route search unit, is traveled by the electric vehicle, based on information on electric power to be consumed when the electric vehicle travels and geographical information relating to the route.

15 Claims, 8 Drawing Sheets

(56) References Cited

U.S. PATENT DOCUMENTS

| | | | |
|---|---|---|---|
| 6,997,048 B2* | 2/2006 | Komatsu | B60C 23/0408 73/146.2 |
| 7,869,942 B2* | 1/2011 | Naito | G01C 21/343 340/995.19 |
| 2004/0181323 A1* | 9/2004 | Yuan | B60L 15/2045 701/22 |
| 2007/0294026 A1* | 12/2007 | Schirmer | B60W 10/06 701/533 |
| 2009/0234521 A1* | 9/2009 | Kumar | B60L 11/1851 701/19 |
| 2009/0326753 A1 | 12/2009 | Chen et al. | |
| 2010/0010697 A1* | 1/2010 | Soma | B60K 6/445 701/22 |
| 2010/0049397 A1* | 2/2010 | Liu | G01C 21/3469 701/31.4 |
| 2010/0094496 A1* | 4/2010 | Hershkovitz | B60L 3/12 701/22 |
| 2010/0121590 A1 | 5/2010 | Kato | |
| 2011/0246004 A1* | 10/2011 | Mineta | G01C 21/3469 701/22 |
| 2012/0029803 A1* | 2/2012 | Yasushi | B60R 16/0236 701/123 |

* cited by examiner

ROUTE GUIDANCE APPARATUS, ROUTE GUIDANCE METHOD AND COMPUTER PROGRAM

CROSS REFERENCES TO RELATED APPLICATIONS

The present application is a continuation of U.S. application Ser. No. 13/080,292, filed Apr. 5, 2011, which claims priority to Japanese Patent Application JP 2010-093084 filed in the Japanese Patent Office on Apr. 14, 2010, the entire content of each of which is hereby incorporated by reference herein.

BACKGROUND OF THE INVENTION

Field of the Invention

The present invention relates to a route guidance apparatus, a route guidance method and a computer program.

Description of the Related Art

Car navigation systems that are each mounted on a vehicle and perform guidance on a route from a current location to a destination are widely used. Some of the car negation systems are provided with a function by which time taken in traveling to a destination or expected time of arrival in the destination is calculated and such information can be presented to a driver by being displayed on a screen (see JP-A-2008-281362, for example). The driver can drive to the destination by selecting an optimal route, watching the information presented by the car navigation system.

SUMMARY OF THE INVENTION

Most of existing car navigation systems are designed/developed for a gasoline-powered vehicle. It is expected that an electric vehicle driven only by a secondary battery becomes popular in the future for the purpose of reduction of carbon-dioxide emissions, and a car navigation system adjusted to the electric vehicle is also desired.

Traveling with little power consumption is sought from an electric vehicle. And a case is conceivable where a driver would rather select traveling on a route in which less power consumption is to be consumed than on a route in which time taken to traveling to a destination is shorter, depending on a charging condition of a battery, the location of the nearest charging station, or the like. However, in a car navigation system of the related art, the concept of search for a route in which less electric power is to be consumed in traveling to a destination is not introduced.

Further, power consumption of an electric vehicle per unit distance can be previously known, but at the derivation of a route in which less electric power is to be consumed, existence or non-existence of a gradient on a traveling route and electric power used during traveling for a purpose other than driving the electric vehicle are to be taken into account. Especially, when there exists a gradient on a traveling route to a destination, in case of an upslope, power consumption increases; in case of a downslope, regenerative energy is obtained. Accordingly, an amount of electric power to be consumed in traveling on a road with a gradient is different from that in traveling on an even road for the same distance.

In light of the foregoing, it is desirable to provide a route guidance apparatus, a route guidance method, and a computer program, which are novel and improved, and which are capable of, when a route to a destination is traveled by an electric vehicle driven by a secondary battery, calculating electric power to be consumed by the electric vehicle and presenting calculation results to a driver.

According to an embodiment of the present invention, there is provided a route guidance apparatus including a route search unit which searches for at least one route, to a predetermined destination, which is to be traveled by an electric vehicle propelled by electric power stored in a secondary battery provided within the vehicle, and a power consumption calculation unit which calculates power consumption of the electric vehicle when a route to a destination, which was searched for by the route search unit, is traveled by the electric vehicle, based on information on electric power to be consumed when the electric vehicle travels and geographical information relating to the route.

The route guidance apparatus may further include a recording unit which has gradient information for a road recoded therein, and a power information holding unit which holds information on power consumption of the electric vehicle per gradient and information on an acquisition amount of regenerative energy of the electric vehicle per gradient. The power consumption calculation unit may calculate power consumption using the gradient information recorded in the recording unit and the information held in the power information holding unit.

The route guidance apparatus may further include a power consumption presenting unit on which a route, which was searched for by the route search unit, is presented together with power consumption calculated by the power consumption calculation unit.

The power consumption presenting unit may present a route in which the least electric power of the electric vehicle is to be consumed in traveling to a destination, among routes which were searched for by the route search unit.

The predetermined destination may be multiple. The power consumption presenting unit may present a route to a destination, among the multiple destinations, to which less electric power of the electric vehicle is to be consumed.

The power consumption calculation unit may calculate power consumption of the electric vehicle in traveling a route to a destination, which was searched for by the route search unit, with consideration of power consumption of a device provided on the electric vehicle. Further, the power consumption calculation unit may recalculate power consumption of the electric vehicle in traveling a route to a destination, which was searched for by the route search unit, when variation in power consumption of the device has been detected.

The power consumption calculation unit may calculate power consumption of the electric vehicle in traveling a route to a destination, which was searched for by the route search unit, with consideration of a load of the electric vehicle.

The power consumption calculation unit may calculate, in taking into account of a load of the electric vehicle, power consumption of the electric vehicle in traveling a route to a destination, which was searched for by the route search unit, with consideration of the number of persons on the electric vehicle.

The power consumption calculation unit may calculate power consumption of the electric vehicle in traveling a route to a destination, which was searched for by the route search unit, with consideration of external circumstances in which the electric vehicle travels.

The power consumption calculation unit may preferentially search for a route in which less electric power of the electric vehicle is to be consumed, when a remaining amount of electric power of the secondary battery is less than or equal to a predetermined amount.

According to another embodiment of the present invention, there is provided a route guidance method, including the steps of searching for at least one route, to a predetermined destination, which is to be traveled by an electric vehicle propelled by electric power stored in a secondary battery provided within the vehicle, and calculating power consumption of the electric vehicle when a route to a destination, which was searched for by the step of route-searching, is traveled by the electric vehicle, based on information on electric power to be consumed when the electric vehicle travels and geographical information relating to the route.

According to another embodiment of the present invention, there is provided a computer program for causing a computer to execute the steps of searching for at least one route, to a predetermined destination, which is to be traveled by an electric vehicle propelled by electric power stored in a secondary battery provided within the vehicle, and calculating power consumption of the electric vehicle when a route to a destination, which was searched for by the step of route-searching, is traveled by the electric vehicle, based on information on electric power to be consumed when the electric vehicle travels and geographical information relating to the route.

According to the embodiments of the present invention described above, it is possible to provide a route guidance apparatus, a route guidance method, and a computer program, which are novel and improved, and which are capable of, when a route to a destination is traveled by an electric vehicle driven by a secondary battery, calculating electric power to be consumed by the electric vehicle and presenting calculation results to a driver.

DETAILED DESCRIPTION OF THE EMBODIMENTS

Figure 1:
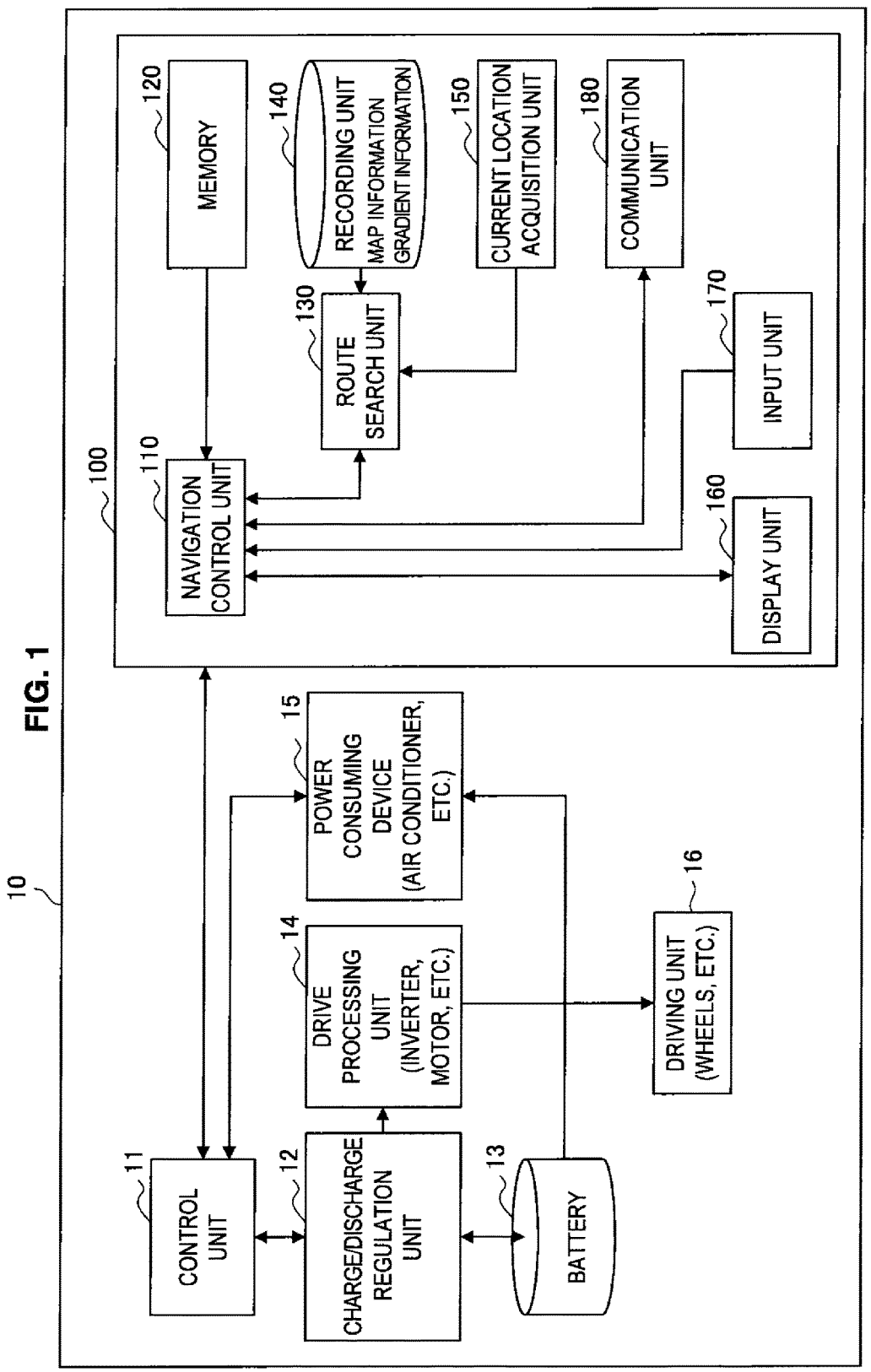
FIG. 1 is an explanatory diagram illustrating a configuration of an electric vehicle 10 having a navigation system 100 according to an embodiment of the present invention mounted thereon.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
<1. An embodiment of the present invention>
[1-1. Configuration of electric vehicle]
[1-2. Operation of navigation system]
<2. Summary>

<1. An Embodiment of the Present Invention>
[1-1. Configuration of Electric Vehicle]

First, a configuration of an electric vehicle 10 having a navigation system 100 according to an embodiment of the present invention mounted thereon will be explained. FIG. 1 is an explanatory diagram illustrating the configuration of the electric vehicle 10 having the navigation system 100 according to the embodiment of the present invention mounted thereon. Hereafter, the configuration of the electric vehicle 10 will be explained using FIG. 1.

As shown in FIG. 1, the electric vehicle 10 having the navigation system 100 according to the embodiment of the present invention mounted thereon includes a control unit 11, a charge/discharge regulation unit 12, a battery 13 including a secondary battery, a drive processing unit 14 including a motor, an inverter, or the like, a power consuming device 15 including an air conditioner, a car audio system, or the like, a driving unit 16 including wheels, or the like, and the navigation system 100.

Further, the navigation system 100 according to the embodiment of the present invention includes a navigation control unit 110, a memory 120, a route search unit 130, a recording unit 140, a current location acquisition unit 150, a display unit 160, an input unit 170, and a communication unit 180.

The control unit 11 controls overall operation of the electric vehicle 10. For example, when a driver is pressing the accelerator pedal (not shown), an acceleration instruction is transmitted to the driving unit 16 via the charge/discharge regulation unit 12 and the drive processing unit 14, and when the driver is pressing the brake pedal (not shown), a deceleration instruction is transmitted to the driving unit 16 via the charge/discharge regulation unit 12 and the drive processing unit 14. Further, when the driver turns the steering wheel (not shown), an instruction for direction of wheels to be changed according to the steering operation is transmitted to the driving unit 16.

Furthermore, the control unit 11 also controls operation of the navigation system 100. For example, when an instruction for the navigation system 100 to be started is received from a driver, the control unit 11 starts the navigation system 100. After the navigation system 100 has been started, the navigation system 100 operates then according to control by the navigation control 110.

The charge/discharge regulation unit 12 regulates charge/discharge of the battery 13. At the time of charge of the battery 13, electric power is externally supplied via a connecting plug (not shown). The electric power is then received by the charge/discharge regulation unit 12, which supplies the same to the battery 13. Thus, the battery 13 is charged with electric power in such a manner that the battery 13 is provided with the electric power from the charge/discharge regulation unit 12. When causing the driving unit 16 to be driven using electric power stored in the battery 13, the charge/discharge regulation unit 12 supplies, according to the control by the control unit 11, electric power of the battery 13 to the drive processing unit 14, and the drive processing unit 14, which has been provided with the electric power, causes the driving unit 16 to be driven. Further, electric power may be externally discharged from the battery 13 via the above connecting plug as necessary.

The battery 13 includes a secondary battery as described above, and has enough capacity to enable the electric vehicle 10 to be continuously driven for the predetermined time. Examples of secondary batteries which may be each used as the battery 13 include a lithium-ion battery, a nickel-hydrogen battery, a lead storage battery and a NAS battery (a sodium-sulfur battery), but it may be not only a storage battery that is currently available, but also any battery that would become available in the future as a power source of the electric vehicle.

The drive processing unit 14 includes a motor, an inverter, or the like and is for driving the driving unit 16. The drive processing unit 14 is powered by electric power stored in the battery 13 and when the electric vehicle 10 travels, the drive processing unit 14 receives supply of the electric power from the battery 13 to drive the driving unit 16. Further, it may be that, when it is traveled on a downslope, when the accelerator pedal which has been depressed is released, when the brake pedal is pressed, or the like, regenerative energy is recovered by a motor and the battery 13 is charged with the regenerative energy via the charge/discharge regulation unit 12.

The power consuming device 15 includes an air conditioner, a car audio system, or the like, as described above, and operates on electric power stored in the battery 13. Accordingly, electric power stored in the battery 13 also gradually decreases while the power consuming device 15 operates.

The driving unit 16 includes wheels, or the like, as described above, and propels the electric vehicle 10 by being driven by the drive processing unit 14.

Next, each part of the navigation system 100 will be explained. The navigation control unit 110 controls operation of the navigation system 100 and includes a Central Processing Unit (CPU), for example. The navigation control unit 110 may control the operation of the navigation system 100, for example, by reading out computer programs stored in the memory 120 and sequentially executing the computer programs. In the present embodiment, the navigation control unit 110 has a function of calculating power consumption when a route is traveled by the electric vehicle 10, the route having been searched for by the later-described route search unit 130.

The memory 120 stores a computer program or various data used for operation of the navigation system 100. For example, information on a traveling distance of the electric vehicle 10 per unit power, information on power consumption of the electric vehicle 10 per gradient, or information on a generation amount of regenerative energy per gradient is stored as various data in the memory 120. Such information is used for route search processing in the route search unit 130. Besides, when the information on a traveling distance of the electric vehicle 10 per unit power agrees with the information on power consumption of the electric vehicle 10 per gradient in case of non-existence of a gradient, the information on a traveling distance of the electric vehicle 10 per unit power does not have to be stored specially.

The information on power consumption per gradient or a generation amount of regenerative energy, which is to be stored in the memory 120, may be each previously determined for each gradient angle, or data for a representative angle may be determined. When the information on power consumption or a generation amount of regenerative energy for a representative angle is stored in the memory 120, the navigation control unit 110 may determine information for any other angle by interpolation.

The route search unit 130 searches for a route from a current location to a destination specified by a driver of the electric vehicle 10, using information stored in the memory 120 and map information/gradient information recorded in the recording 140, under control by the navigation control unit 110. Information on a route, which was searched for by the route search unit 130, is displayed on the display unit 160 together with the map information. The driver of the electric vehicle 10 can drive the electric vehicle 10 to the destination, by referring to the route displayed on the display unit 160.

Further, the route search unit 130 may use traffic jam information acquired by the communication unit 180 in the route search processing. The route search unit 130 can search for a route to avoid a traffic jam, and present the same to the driver of the electric vehicle 10, by using the traffic jam information acquired by the communication unit 180.

The recording unit 140 has information used for route search processing by the route search unit 130 stored therein. As described above, map information and gradient information are stored in the recording unit 140. The gradient information is information on how many times a road rises or descends between two predetermined points, for example.

The route search unit 130 performs, in search for a route from a current location to a destination, route searching processing with consideration of the gradient information for a route stored in the recording unit 140, under control by the navigation control unit 110. Thereby, the route search unit 130 can search for not only a route whose distance is shorter or a route in which time taken in traveling to a destination is shorter, but also a route in which less electric power of the electric vehicle 10 is to be consumed, and can present the same to a driver of the electric vehicle 10, thereby making it possible to expand the range of route options for a driver.

The current location acquisition unit 150 acquires the latitude/longitude of a current location at any time, for example, by communication with a Global Positioning System (GPS) satellite. Information on the current location acquired by the current location acquisition unit 150 is displayed in such a manner that the information on the current location is superposed on the map information displayed on the display unit 160, and is used for route search processing in the route search unit 130.

The display unit 160 has various types of information relating to route search processing by the navigation system 100 displayed thereon. The display unit 160 may be, for example, a liquid crystal display, an organic EL display, or any other display device. As information displayed on the display unit 160, there are given, for example, a map of the area surrounding the current location acquired by the current location acquisition unit 150, a map of the area surrounding a destination, a route from the current location to the destination as well as expected power consumption in traveling the route to the destination, and expected time of arrival in the destination.

The input unit 170 is an input device by which a driver of the electric vehicle 10 performs input operation. The driver of the electric vehicle 10 can performs, for example, input of a destination, or selection of a route, which was searched for by the route search unit 130 and is displayed on the display unit 160, by operating the input unit 170.

The communication unit 180 conducts radio communication with an external server. The communication unit 180 receives from the external server various types of information related to route search processing by the route search unit 130 and sends the same to the navigation control unit 110. As various types of information related to route search processing, there are given, for example, traffic jam information of a road, road-construction information, and new map information updated. The route search unit 130 can search for a route to avoid a traffic jam or a point of road construction, by performing route search processing using the various types of information relating to route search processing, which was received by the communication unit 180.

Besides, it may be that the navigation system 100 operates by receiving supply of electric power from a built-in battery (not shown), or operates by receiving supply of electric power from the battery 13.

Furthermore, the input unit 170 may be a touch panel, and in such a case, the navigation system 100 may be provided with a touch panel device on the whole surface of the display unit 160, and may include the display unit 160 and the input unit 170 which are provided in an integrated manner.

The electric vehicle 10 shown in FIG. 1 is propelled only by the battery 13 as a power source. When the electric vehicle 10 is driven, capacity of the battery 13 is then to be taken into account and traveling on a route in which as little electric power as possible is to be consumed is desired. Accordingly, the navigation system 100 according to the embodiment of the present invention preferentially searches for a route in which less electric power of the electric vehicle 10 is to be consumed and presents to a driver the route which it searched for. The driver of the electric vehicle 10 can efficiently drive the electric vehicle 10, by selecting a route which is presented by the navigation system 100 and in which less electric power is to be consumed.

In the above, the configuration of the electric vehicle 10 having the navigation system 100 according to the embodiment of the present invention mounted thereon has been explained using FIG. 1. Next, operation of the navigation system 100 according to an embodiment of the present invention will be explained.

[1-2. Operation of Navigation System]

The navigation system 100 according to an embodiment of the present invention performs, in search for a route to a destination, searching processing with priority on a route in which less electric power of the electric vehicle 10 is to be consumed, in addition to searching processing with priority on a distance or searching processing with priority on time taken in traveling to a destination of the related art. Further, when the navigation system 100 preferentially searches for a route in which less electric power of the electric vehicle 10 is to be consumed, the navigation system 100 takes into account information on a gradient on a route.

As described above, when traveling on an upslope, power consumption of the electric vehicle 10 increases in comparison with traveling on an even road for the same distance. And when the electric vehicle 10 travels on a downslope, not only less electric power is to be consumed due to inertia, but also regenerative energy is obtained due to braking operation of a driver, thereby enabling traveling distance of the electric 10 to be increased.

Figure 2:
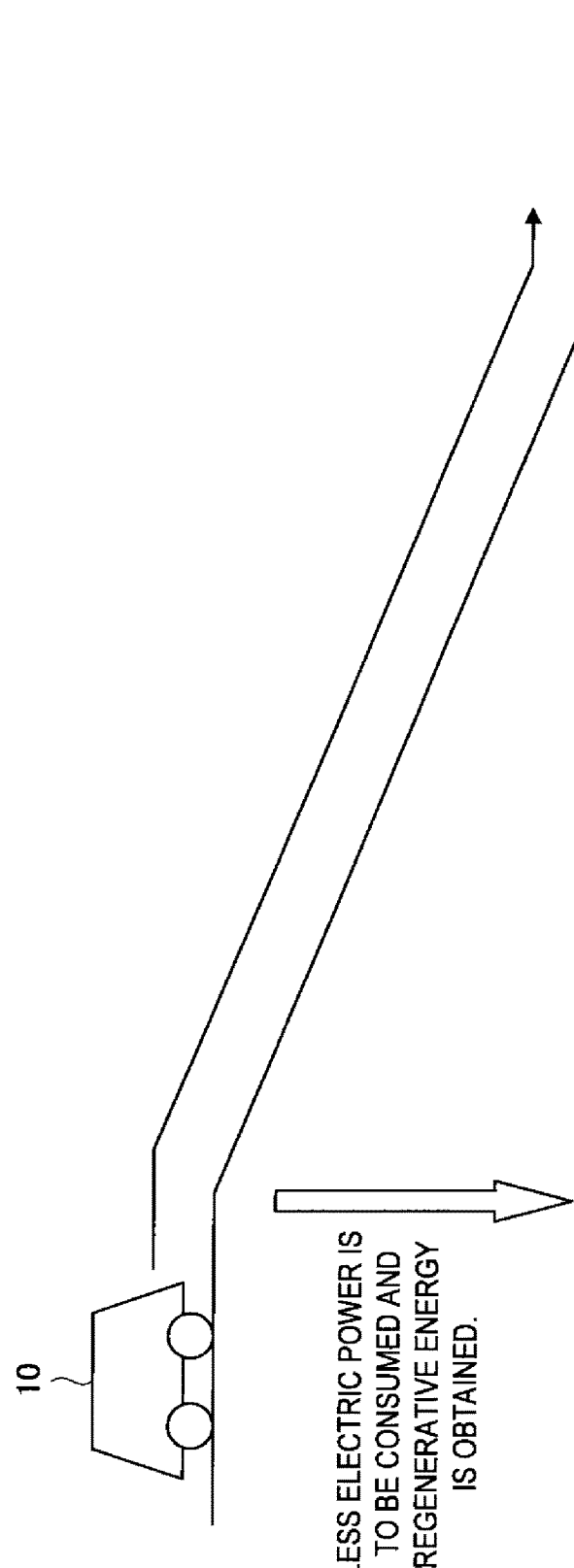
FIG. 2 is an explanatory diagram schematically illustrating a relationship between power consumption of the electric vehicle 10 and gradient.
Figure 3:
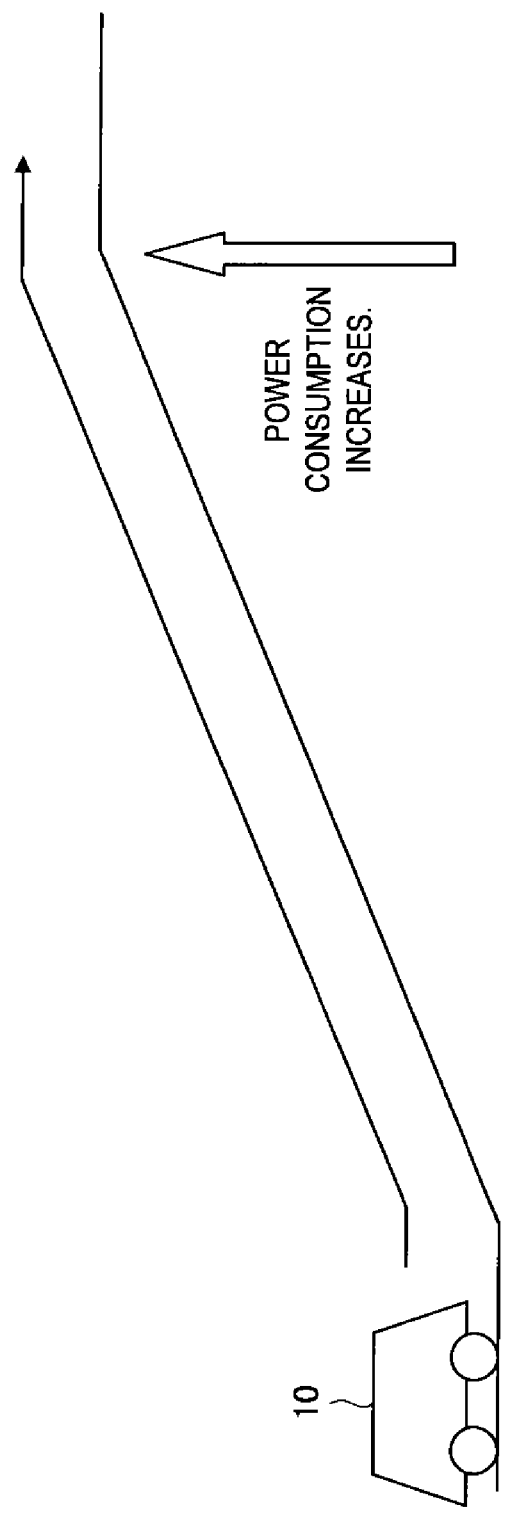
FIG. 3 is an explanatory diagram schematically illustrating a relationship between power consumption of the electric vehicle 10 and gradient.
Figure 4:
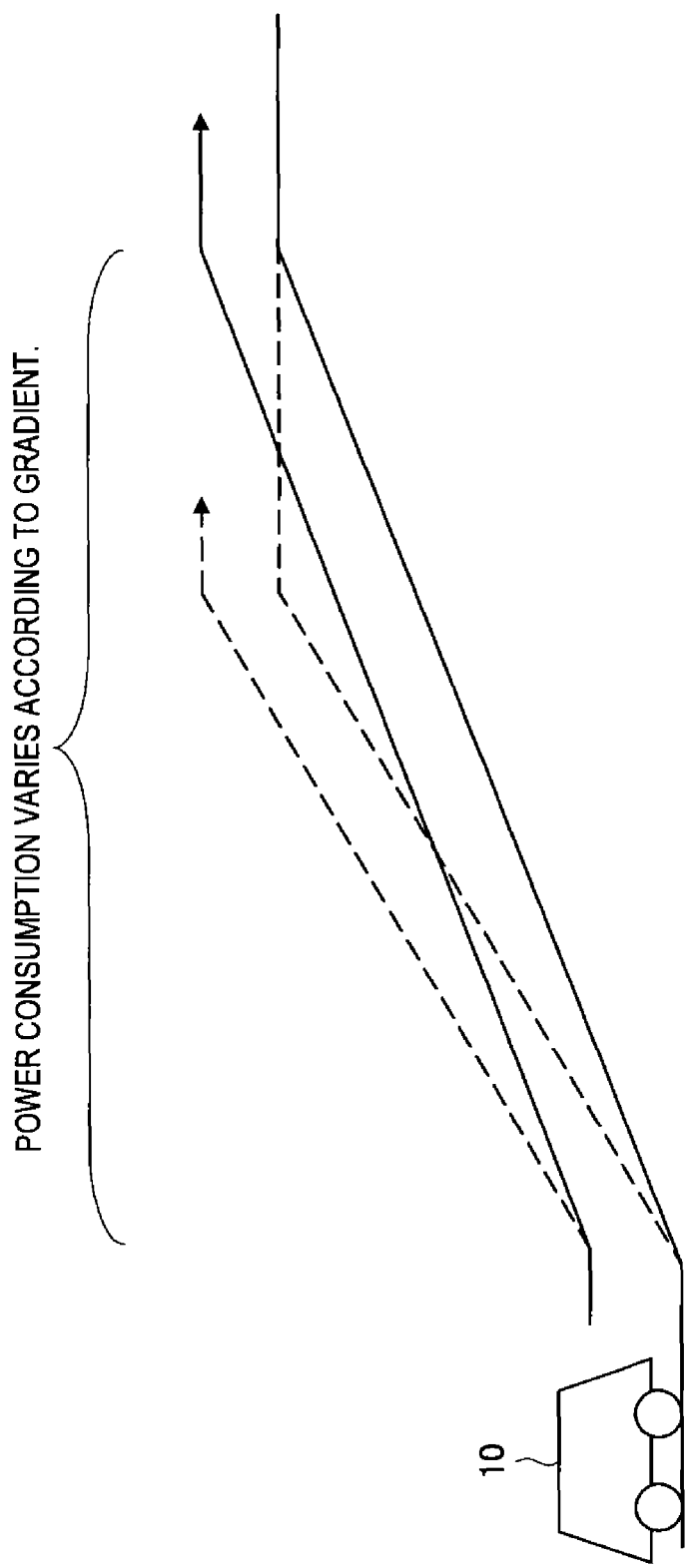
FIG. 4 is an explanatory diagram schematically illustrating a relationship between power consumption of the electric vehicle 10 and gradient.

FIGS. 2 to 4 are each an explanatory diagram schematically illustrating a relationship between power consumption of the electric vehicle 10 and gradient. Hereafter, in FIGS. 2 to 4, the relationship between power consumption of the electric vehicle 10 and gradient will be explained.

FIG. 2 illustrates a relationship between power consumption of the electric vehicle 10 and gradient when the electric vehicle 10 travels on a downslope. As can be seen, when the electric vehicle 10 travels on a downslope, not only less electric power is to be consumed due to inertia, but also regenerative energy is obtained due to braking operation of a driver, resulting in expanding the distance that can be traveled by the electric vehicle 10.

On the other hand, FIG. 3 illustrates a relationship between power consumption of the electric vehicle 10 and gradient when the electric vehicle 10 travels on an upslope. As can be seen, when traveling on an upslope, power consumption of the electric vehicle 10 increases in comparison with traveling on an even road for the same distance, resulting in shortening distance that can be traveled by the electric vehicle 10.

Further, influence on power consumption of the electric vehicle 10 varies depending on gradient of an upslope. FIG. 4 illustrates a relationship between power consumption of the electric vehicle 10 and gradient when the electric vehicle 10 travels on an upslope. As shown in FIG. 4, the steeper the gradient of the upslope is, the more electric power is needed in order to travel on the upslope, thereby further shortening the distance that can be traveled by the electric vehicle 10.

Accordingly, the navigation system 100 according to the embodiment of the present invention uses, in preferentially searching for a route in which less electric power of the electric vehicle 10 is to be consumed, information on power consumption of the electric vehicle 10 per gradient, which is recorded in the memory 120, and gradient information recorded in the recording unit 140. Thereby, the navigation system 100 according to the embodiment of the present invention can search for a route in which the least electric power is to be consumed in traveling to a destination and present the same to a driver.

Figure 5:
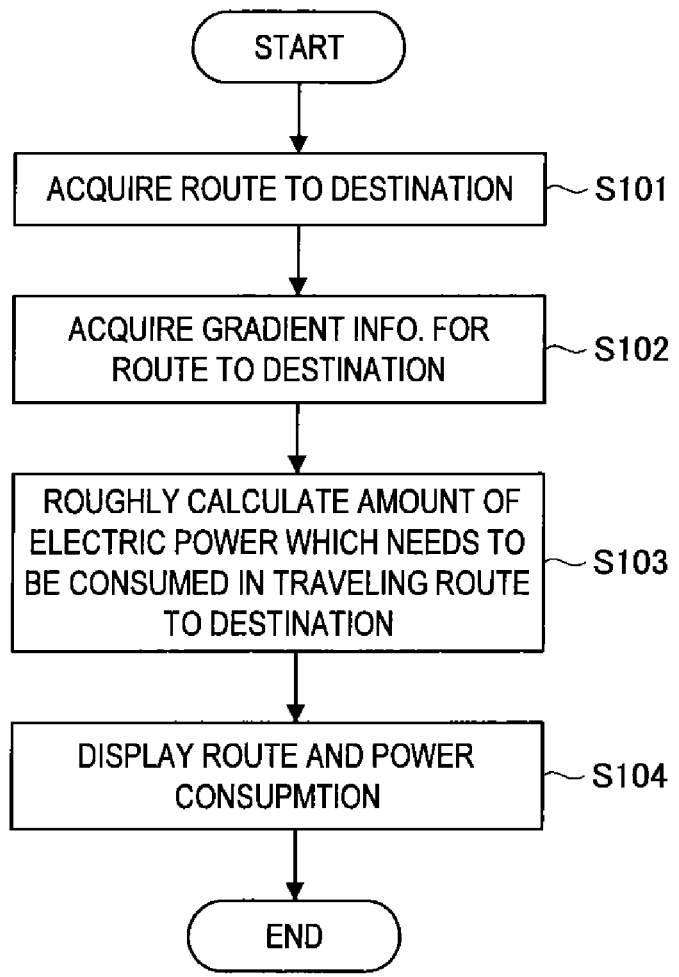
FIG. 5 is a flow diagram illustrating operation of the navigation system 100 according to the embodiment of the present invention.

FIG. 5 is a flow diagram illustrating operation of the navigation system 100 according to an embodiment of the present invention. Hereafter, the operation of the navigation system 100 according to the embodiment of the present invention will be explained using FIG. 5.

When a driver of the electric vehicle 10 gives, by the input unit 170, to the navigation system 100 an instruction for a route to a given destination to be searched for, the navigation control unit 110 instructs the route search unit 130 to search for a route from a current location, which was acquired by the current location acquisition unit 150, to a destination, which was specified by the input unit 170.

The route search unit 130, which has received a route-search instruction from the navigation control unit 110, searches map information, recorded in the recording unit 140, for a route from a current location to a destination (step S101). In some cases, there is one route from a current location to a destination. However, because there are usually one or more branch points in an interval from a current location to a destination, the route search unit 130 searches map information, recorded in the recording unit 140, for as many routes as possible.

Besides, in search for a route from a current location to a destination, it may be that the route search unit 130 excludes a too circuitous route and a route including a narrow road. Further, the number of routes, which are to be searched for by the route search unit 130, may be previously determined. With respect to this processing of searching for a route from a current location to a destination itself, techniques for existing route-search processing may be used.

When the route search unit 130 has searched for a route from a current location to a destination, the route search unit 130 next acquires gradient information for a route to the destination, which was searched for, using gradient information between branch points, recorded in the recording unit 140 (step S102). The route search unit 130 can acquire, by processing this step S102, gradient information for each route, which was searched for in the above step S101.

When the route search unit 130 has acquired a route from a current location to a destination and gradient information for each route, the navigation control unit 110 roughly calculates then, from a route and gradient information each acquired from the recording unit 140 by the route search unit 130, an amount of electric power which needs to be consumed in traveling each route (step S103). Information on the amount of electric power which needs to be consumed in traveling each route is transmitted to the route search unit 130, the amount of electric power having been calculated by the navigation control unit 110.

When the navigation control unit 110 calculates in this step S103 the amount of electric power which needs to be consumed in traveling for each route, the navigation control unit 110 uses a travel amount per unit power, and power consumption or a generation amount of regenerative energy per gradient. By referring to such information stored in the memory 120, the navigation control unit 110 can roughly calculate an amount of electric power to be consumed in traveling each route, which was searched for by the route search unit 130.

Besides, as described above, in search for a route from a current location to a destination, the route search unit 130 may exclude a too circuitous route and a route including a narrow road. Accordingly, in some cases, a route in which not necessarily the least electric power is to be consumed is selected in the above step S101, as a result of rough calculation of power consumption in the above step S103.

In this rough calculation of power consumption by the navigation control unit 110, time taken in traveling from a current location to a destination may be determined by rough calculation, using a legal speed of a road on a route, a traveling speed of the electric vehicle 10, traffic jam information, other external information, or the like, and an amount of electric power to be consumed by the power consuming device 15 during traveling may be calculated, and the amount of electric power may be reflected in an amount of electric power which needs to be consumed in traveling to a destination. Thereby, the route search unit 130 can determine a route in which, for example, a gradient on the route is gentle and which can be traveled with little power consumption, but in which power consumption of the power consuming device 15 increases due to long travel time, so that overall power consumption becomes greater than that on other routes.

When it is assumed, before traveling to a destination or during traveling to a destination, that a storage amount of the battery 13 will become insufficient, the navigation control unit 110 may give a warning on the display unit 160, or the navigation control unit 110 may calculate an amount of electric power which needs to be reduced in order to reach a destination and present on the display unit 160 countermeasures necessary for achieving the reduction of electric power, or may automatically adjust operation of the power consuming device 15. Examples of countermeasures necessary for achieving the reduction of electric power may include control over operation of the power consuming device 15, that is, for example, turn-off of an air conditioner, regulation of temperature of the air conditioner, and turn-off of an audio-visual device.

When an amount of electric power to be consumed by the power consuming device 15 during traveling is reflected in an amount of electric power which needs to be consumed in traveling to a destination, the navigation control unit 110 may display on the display unit 116 information on what to do in order to enable power consumption of the electric vehicle 10 to be reduced. As such information, there are given, for example, change of temperature of an air conditioner, ban on the use of an air conditioner, and ban on the use of a car audio system.

When an amount of electric power to be consumed by the power consuming device 15 during traveling has been varied, the navigation control unit 110 may perform again route search, after the variation results has been reflected. The amount of electric power to be consumed varies due to, for example, turn-on/turn-off of an air conditioner, regulation of temperature of air conditioner, the use of a car audio system/turn-off of a car audio system, a variation in number of persons on board, and variation in loading weight. The variation in number of persons on board may be detected by a sensor or the like, which is provided in a seat. The variation in loading weight may be detected by a sensor which measures loading weight.

When the navigation control unit 110 roughly calculates in the above step S103 an amount of electric power which needs to be consumed in traveling each route searched for, the navigation control unit 110 transmits to the display unit 160 information on a route, which was searched for by the route search unit 130, a traveling distance on each route, and an amount of electric power which needs to be consumed in traveling each route, the amount of electric power having been roughly calculated by the navigation control unit 110, and displays the same on the display unit 160 (step S104).

Here, in displaying on the display unit 160, the navigation control unit 110 may display all routes, which were searched for in the above step S101, and information on the routes, or may display only a route which meets a condition, that is, a route in which the least electric power is to be consumed, and information relating to the route.

Figure 6:
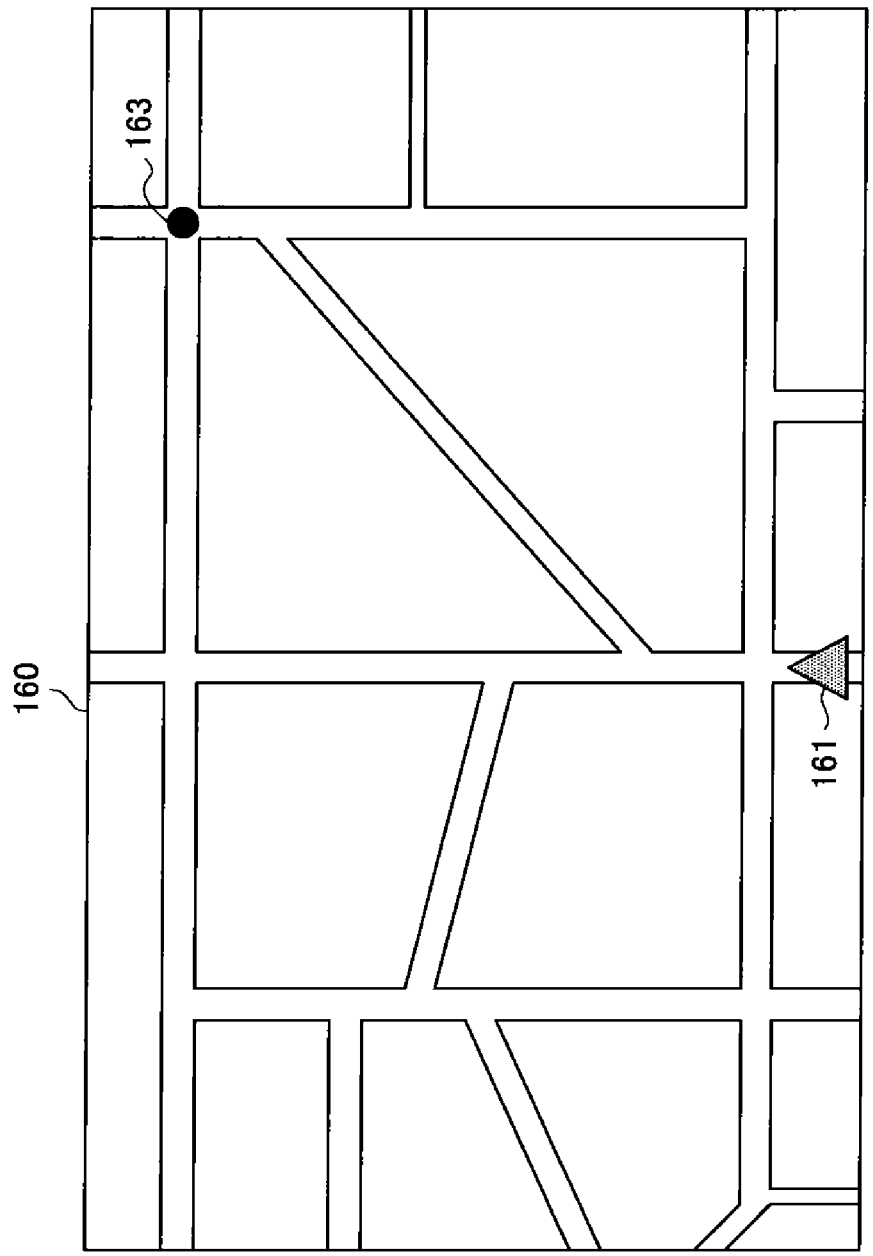
FIG. 6 is an explanatory diagram illustrating an example of a screen shown on a display unit 160 of the navigation system 100.

FIG. 6 is an explanatory diagram illustrating an example of a screen shown on the display unit 160 of the navigation system 100. The screen illustrated in FIG. 6 shows a state where a destination is input by a driver operating the input unit 170.

In FIG. 6 shown is a state where a current-location icon 161 indicating a current location of the electric vehicle 10 and a destination icon 163 indicating a destination which the driver has input by operating the input unit 170 are displayed. It should be appreciated that, as a matter of course, a shape of each icon is not limited to that shown in FIG. 6.

When a destination is specified by operation of the input unit 170 by a driver, the navigation system 100 searches, by processing as described above, for a route from a current location to the destination.

Figure 7:
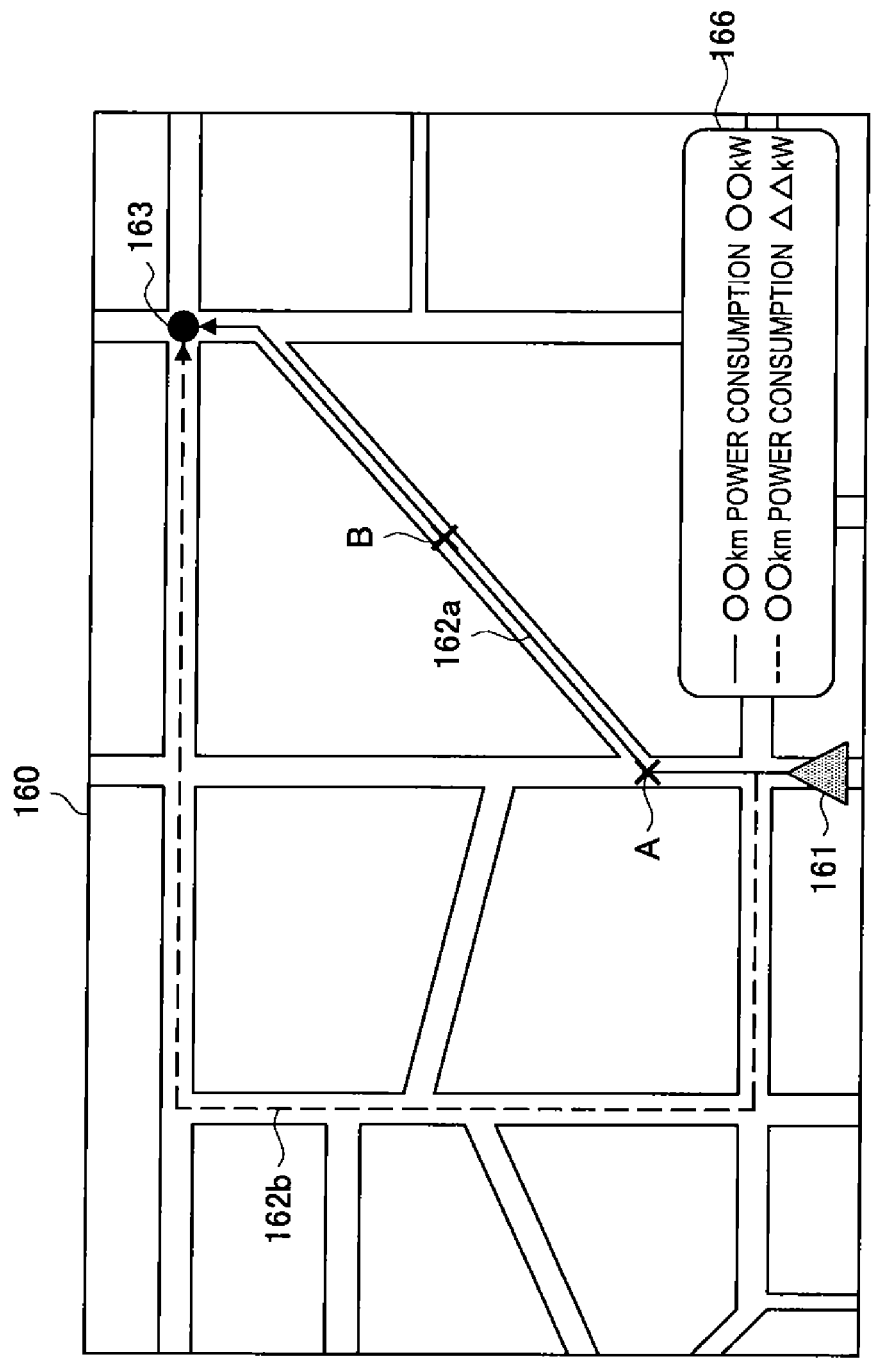
FIG. 7 is an explanatory diagram illustrating an example of a screen shown on the display unit 160 of the navigation system 100.

FIG. 7 is an explanatory diagram illustrating an example of a screen shown on the display unit 160 of the navigation system 100. The screen illustrated in FIG. 7 shows a state where a route from a current location to a destination is displayed on the display unit 160, the route having been searched for by the route search unit 130. Further, in FIG. 7 shown are pieces of route information 162a, 162b, each indicating a route from the current-location icon 161 to the destination icon 163.

Referring to FIG. 7, a route indicated by route information 162a has a shorter distance from the current location to the destination. However, a gradient between the points A and B is steep. And accordingly, in traveling from the current location to the destination along the route indicated by the route information 162a, when more electric power is to be consumed than in traveling from the current location to the destination along the route indicated by the route information 162b, a driver of the electric vehicle 10 can more efficiently drive when the driver selects the route indicated by the route information 162b. Further, in a case where, according to road traffic jam information obtained via the communication unit 180, the destination is to be earlier reached by traveling the route 162a than by traveling the route 162b, when less electric power of the battery 13 is to be consumed in traveling the route 162b than in traveling the route 162a with consideration of power consumption of the power consuming device 15, the driver of the electric vehicle 10 can more efficiently drive when the driver selects the route indicated by the route information 162b.

Therefore, the navigation control unit 110 may display on the display unit 160, for example, as shown in FIG. 7, a traveling information display unit 166 for displaying traveling information such as a distance and power consumption in traveling from a current location to a destination. In the example shown in FIG. 7, a distance from the current location to the destination in traveling each route and power consumption in traveling to the destination are displayed on the traveling information display unit 166.

In this manner, by displaying various types of traveling information on the traveling information display unit 166, the navigation system 100 can present to the driver of the electric vehicle 10 information not only on a route along which the destination can be earlier reached, but also information on a route in which the least electric power is to be consumed.

Besides, electric power stored in the battery 13 is consumed every moment while the driver of the electric vehicle 10 drives the electric vehicle 10. Accordingly, electric power consumed in the battery 13 may be reflected, at a predetermined interval during traveling, in power consumption roughly calculated in the above step S103.

In the above, the operation of the navigation system 100 according to an embodiment of the present invention has been explained using FIG. 5. Next, another example of operation of the navigation system 100 according to an embodiment of the present invention will be explained.

In the above explanation, a case has been described where a driver of the electric vehicle 10 causes the navigation system 100 to search for a route, by inputting a predetermined destination into the navigation system 100. However, the driver of the electric vehicle 10 sometimes wants the navigation system 100 to search for a destination which meets a condition and a route to the destination. It is, for example, a case where the driver of the electric vehicle 10 wants to search for a charging facility (a charging station) adjacent to the current location. Especially when little electric power remains in the battery 13, it is preferable to reach the charging station by as little electric power as possible being consumed.

In such a case, the navigation system 100 may extract a destination which meets the input condition from map information recorded in the recording unit 140; and may also search for a route to the destination and display the same on the display unit 160. Further, the navigation system 100 may display on the display unit 160 information such as a traveling distance in traveling to each destination and power consumption.

Figure 8:
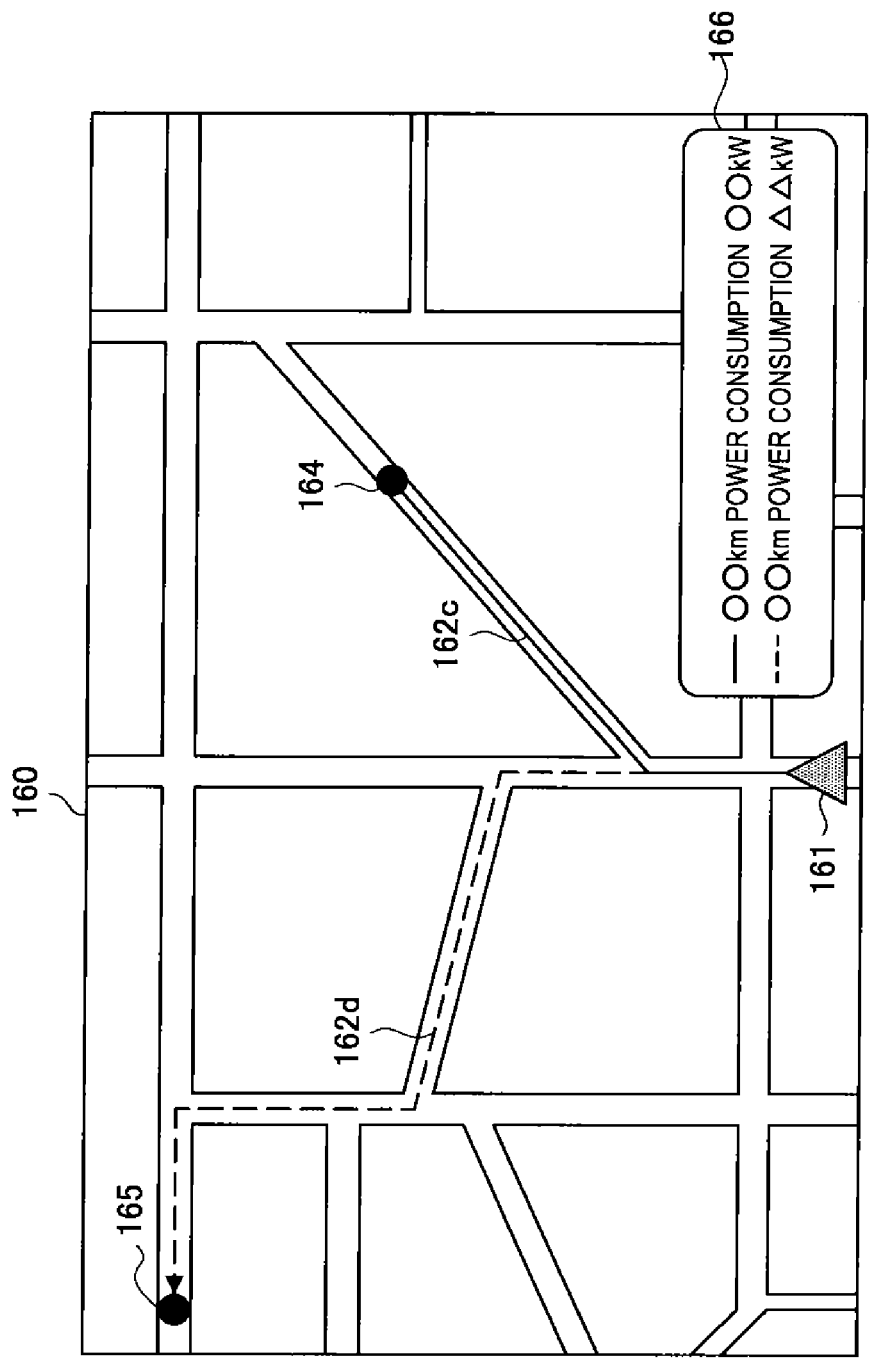
FIG. 8 is an explanatory diagram illustrating an example of a screen shown on the display unit 160 of the navigation system 100.

FIG. 8 is an explanatory diagram illustrating an example of a screen shown on the display unit 160 of the navigation system 100. The screen illustrated in FIG. 8 shows a state where a route from a current location to a destination, which meets a condition specified by a driver of the electric vehicle 10, is displayed on the display unit 160, the route having been searched for by the route search unit 130.

FIG. 8 shows a state where a current-location icon 161 indicating a current location, determination icons 164, 165, each indicating a destination which was searched for by the route search unit 130, pieces of route information 162c, 162d, each indicating a route from a current location to a destination, are displayed on the display unit 160. Here, it will be explained under the assumption that destinations indicated by the destination icons 164, 165, respectively, are each a charging station where the battery of the electric vehicle 10 can be charged with electric power.

As can be seen in FIG. 8, as to a distance from a current location to a destination, a distance to the destination indicated by the destination icon 164 is shorter. However, as to power consumption in traveling to a destination, in some cases, less electric power is to be consumed in traveling to the destination indicated by the destination icon 165. It is a case where there is an upslope on the route indicated by the route information 162c and there is a downslope on the route indicated by the route information 162d. When little electric power remains in the battery 13 and a driver wants to drive by as little electric power as possible being consumed, it is sometimes better to travel to the destination indicated by the determination icon 165, according to a route indicated by the route information 162d. In this manner, the navigation system 100 can provide a driver of the electric vehicle 10 with various route options, by searching for a destination to which less power consumption is to be consumed and presenting the same to the driver.

<2. Summary>

As described above, in the navigation system 100 according to an embodiment of the present invention, when a route from a current location to a destination is searched for, it is possible to perform search for a route with priority on less power consumption, in addition to search for a route with a priority on time and search for a route with priority on a distance of the related art.

In addition to road information, gradient information for a road is held in the navigation system 100 according to an embodiment of the present invention. It is previously measured how much electric power the electric vehicle 10 will consume or how much regenerative energy will be obtained, depending on angle of a gradient, and measurement results are held in the memory 120.

When a driver of the electric vehicle 10 gives instruction on a destination to the navigation system 100, the route search unit 130 searches for a route to the destination, on which the instruction has been given. However, in search for a route, the route search unit 130 performs also search for a route with priority on a route in which less electric power is to be consumed in traveling to the destination, in addition to search for a route with priority on time and search for a route with priority on a distance of the related art. Power consumption in traveling to the destination is calculated by the navigation control unit 110. The navigation control unit 110 performs then processing of calculating power consumption using power consumption or a generation amount of regenerative energy per gradient. By searching for a route from a current location to a destination in this manner, it is possible to present to the driver the route in which less electric power of the electric vehicle 10 is to be consumed.

Further, the navigation control unit 110 adds to power consumption in traveling to a destination, power consumption of the electric power consumption device 15 in the electric vehicle 10, which is calculated from expected time of arrival in the destination and power consumption of an in-vehicle device currently used. By taking into consideration power consumption of the power consuming device 15, the navigation system 110 can determine more precise power consumption in traveling to the destination.

It should be understood by those skilled in the art that various modifications, combinations, sub-combinations and alterations may occur depending on design requirements and other factors insofar as they are within the scope of the appended claims or the equivalents thereof.

For example, in the above embodiment, a memory having information on a travel amount of the electric vehicle 10 per unit power and power consumption of the electric vehicle 10 per gradient stored therein is provided in the navigation system 100, but the present invention is not limited to this example. For example, a recording medium, such as a memory, having information on a travel amount of the electric vehicle 10 per unit power and power consumption of the electric vehicle 10 per gradient stored therein may be provided outside of the navigation system 100 but inside of the electric vehicle 10, and the navigation system 100 may read out information from the recording medium in route search.

Further, for example, when power consumption of the electric vehicle 10 has been changed because a driver of the electric vehicle 10 operated the power consuming device 15 (for example, when a driver or the like of the electric vehicle 10 turned on an air conditioner, when a driver or the like of the electric vehicle 10 changed the temperature of the air conditioner, when the number of persons on board has changed, and when loading weight has changed), the navigation control unit 110 may recalculate, at that time, power consumption of the electric vehicle 10 in traveling to a destination. Further, when, as a result of re-calculation, a route in which the least electric power is to be consumed, among routes to a destination, has been changed to another route, the navigation system 100 may display on the display unit 160 such other route to a destination, or when a destination to which the least electric power is to be consumed has been changed to another destination, the navigation system 100 may display on the display unit 160 a route to such other destination.

Further, for example, the navigation system 100 may take into account external circumstances such as date, weather, and external temperature, in calculating power consumption in traveling to a destination. For Example, if it rains, wipers is then to be used, and accordingly, the navigation control unit 110 may calculate power consumption in traveling to a destination at a high estimate of power consumption, with respect to electric power used for the wipers. Further, for example, it is assumed that an air conditioner is used at high temperature, and accordingly, the navigation control unit 110 may calculate power consumption in traveling to a destination at a high estimate of power consumption, with respect to electric power used for the air conditioner.

Further, for example, the navigation control unit 110 may calculate power consumption with consideration of a load of the electric vehicle 10. This is because the power consumption of the electric vehicle 10 also changes depending on the load of the electric vehicle 10. An example of calculation of power consumption with consideration of a load of the electric vehicle 10 is a calculation method in which the number of person on the electric vehicle 10 is taken into account. For example, when a driver of the electric vehicle 10 specifies a destination to the navigation system 100, the driver inputs also the number of persons on the electric vehicle 10. The navigation control unit 110 may cause the driver to input information on how many adults are on board or how many children are on board. By causing the driver to input the number of persons on the electric vehicle 10, the navigation control unit 110 can know an approximate load of the electric vehicle 10, and can thereby calculate power consumption in traveling to a destination according to the number of persons on the electric vehicle 10. Besides, in order to know the number of persons on board or loading weight of the electric vehicle 10, the number of persons on the electric vehicle 10 may be automatically determined by a sensor, or loading weight of the electric vehicle 10 may be automatically measured by a sensor.

Further, for example, the navigation system 100 may select, in route search, whether to search for a route in a mode with priority on arrival time, in a mode with priority on a traveling distance, or in a mode with priority on a route in which less electric power of the electric vehicle 10 is to be consumed. Further, the navigation system 100 may automatically select priority factor by which the search is to be performed, according to a remaining amount of electric power of the battery 13. For example, when the remaining amount of electric power of the battery 13 is less than or equal to a predetermined amount, the navigation system 100 may search for a route in a mode with priority on a route in which less electric power of the electric vehicle 10 is to be consumed.

What is claimed is:

1. A navigation device for an electric vehicle comprising:
at least one processor configured as a route search unit;
a recording unit including gradient information for a road recorded therein;
a power information holding unit including electrical power consumption information of the electric vehicle per gradient angle and regenerative electrical energy information of the electric vehicle per gradient angle;
a current location acquisition unit including a current location of the electric vehicle; and
a navigation control unit,
wherein the navigation control unit calculates electrical power consumption of the electric vehicle, which was searched for by the route search unit, based on the gradient information, the electrical power consumption information of the electric vehicle per gradient angle, and the regenerative electrical energy information of the electric vehicle per gradient angle, and
wherein the at least one processor is configured to cause a display unit to display a route to the destination with at least electrical power consumption to the destination according to a remaining amount of electric power of the battery.

2. The navigation device according to claim 1,
wherein the route search unit searches for a plurality of respective routes to a plurality of predetermined destinations, and
wherein the display displays a route to a destination, among the plurality of destinations, to which less electric power of the electric vehicle is to be consumed.

3. The navigation device according to claim 1,
wherein the navigation control unit calculates power electrical consumption of the electric vehicle in traveling the route to the destination, which was searched for by the route search unit, with consideration of electrical power consumption of a device provided on the electric vehicle.

4. The navigation device according to claim 3,
wherein the navigation control unit recalculates electrical power consumption of the electric vehicle in traveling the route to the destination, which was searched for by the route search unit, when variation in electrical power consumption of the device has been detected.

5. The navigation device according to claim 1, wherein the navigation control unit calculates electrical power consumption of the electric vehicle in traveling the route to the destination, which was searched for by the route search unit, with consideration of a load of the electric vehicle.

6. The navigation device according to claim 5, wherein the navigation control unit calculates, in taking into account of the load of the electric vehicle, electrical power consumption of the electric vehicle in traveling the route to the destination, which was searched for by the route search unit, with consideration of the number of persons on the electric vehicle.

7. The navigation device according to claim 1, wherein the navigation control unit calculates electrical power consumption of the electric vehicle in traveling the route to the destination, which was searched for by the route search unit, with consideration of external circumstances in which the electric vehicle travels.

8. The navigation device according to claim 1, wherein the navigation control unit preferentially searches for a route in which less electric power of the electric vehicle is to be consumed, when a remaining amount of electric power of the secondary battery is less than or equal to a predetermined amount.

9. The navigation device according to claim 1, wherein the navigation control unit recalculates electrical power consumption of the electric vehicle when operation of the power consumption device is changed.

10. The navigation device according to claim 1, wherein the at least one processor is configured to cause the display to display only a single route with the least electric power consumption of the electric vehicle and information relating to the single route.

11. The navigation device according to claim 1, wherein the current location acquisition unit is a global positioning system device.

12. The navigation device according to claim 1, wherein the at least one processor is configured to cause the display to display an amount of calculated electrical power which needs to be reduced to reach the destination.

13. The navigation device according to claim 1, wherein the at least one processor is configured to cause the display to display at least one countermeasure to reduce an amount of electrical power being consumed by a power consuming device other than a driving unit.

14. A navigation method for an electric vehicle comprising:
searching, by at least one processor, for at least one route;
receiving, from a recording unit, gradient information for a road recorded therein;
receiving, from a power information holding unit, electrical power consumption information of the electric vehicle per gradient angle and regenerative electrical energy information of the electric vehicle per gradient angle;
receiving, from a current location acquisition unit, a current location of the electric vehicle;
calculating, by a navigation control unit, electrical power consumption of the electric vehicle, which was searched for the at least one route, based on the gradient information, the electrical power consumption information of the electric vehicle per gradient angle, and the regenerative electrical energy information of the electric vehicle per gradient angle; and
displaying, by a display unit, a route to the destination with at least electrical power consumption to the destination according to a remaining amount of electric power of the battery.

15. A non-transitory computer program product stored on a computer readable medium that when executed by a processor performs steps for:
searching, by at least one processor, for at least one route;
receiving, from a recording unit, gradient information for a road recorded therein;
receiving, from a power information holding unit, electrical power consumption information of the electric vehicle per gradient angle and regenerative electrical energy information of the electric vehicle per gradient angle;
receiving, from a current location acquisition unit, a current location of the electric vehicle;
calculating, by a navigation control unit, electrical power consumption of the electric vehicle, which was searched for the at least one route, based on the gradient information, the electrical power consumption information of the electric vehicle per gradient angle, and the regenerative electrical energy information of the electric vehicle per gradient angle; and
displaying, by a display unit, a route to the destination with at least electrical power consumption to the destination according to a remaining amount of electric power of the battery.

* * * * *